United States Patent [19]

Hayashi et al.

[11] Patent Number: 5,051,769
[45] Date of Patent: Sep. 24, 1991

[54] FLASH SYSTEM

[75] Inventors: Kohtaro Hayashi; Toshihiko Karasaki; Yasuteru Yamano; Koji Hata, all of Osaka, Japan

[73] Assignee: Minolta Camera Kabushiki Kaisha, Osaka, Japan

[21] Appl. No.: 351,809

[22] Filed: May 15, 1989

[30] Foreign Application Priority Data

May 16, 1988 [JP] Japan .................... 63-118622
Jul. 30, 1988 [JP] Japan .................... 63-190784

[51] Int. Cl.$^5$ ........................... G03B 15/05
[52] U.S. Cl. ................. 354/419; 354/423
[58] Field of Search ......... 354/423, 419, 413, 414, 354/416, 417, 422, 420

[56] References Cited

U.S. PATENT DOCUMENTS 4,550,996 11/1985 Taniguchi et al. ............ 354/416
4,806,963 2/1989 Kobayashi et al. ............ 354/423
4,843,418 6/1989 Taniguchi et al. ............ 354/419

FOREIGN PATENT DOCUMENTS 61-88238 5/1986 Japan .
61-90141 5/1986 Japan .
62-151828 7/1987 Japan .
63-5331 1/1988 Japan .

Primary Examiner—W. B. Perkey
Assistant Examiner—Cassandra C. Spyrou
Attorney, Agent, or Firm—Burns, Doane, Swecker & Mathis

[57] ABSTRACT

An aperture value determining apparatus in taking photographs with flash light in accordance with the present invention receives a full open aperture value of a taking lens employed, information in association with object distance, information in association with film speed, a guide number of a flash apparatus and information in association with shutter speed, measures brightness of an object to be photographed, determines an exposure controlling value based on the information of film speed and on the brightness, calculates a maximum aperture value enabling proper photographing operation with flash light based on the information of the object distance, the information of film speed and the guide number, and sets prescribed aperture value larger than the full open aperture value. The aperture value is determined based on the magnitude of the prescribed aperture value in association with the maximum aperture value, the information of the shutter speed and on the exposure value.

2 Claims, 10 Drawing Sheets

FLASH SYSTEM

BACKGROUND OF THE INVENTION

1. Field of the Invention

The present invention relates to an apparatus for determining an aperture value and, more specifically, to an apparatus for determining the aperture value in taking photographs with flash light.

The present invention further relates to a camera, especially a camera having automatic flash emitting function, in which flash light is automatically emitted when brightness of a subject is low.

2. Description of the Related Art

A lower limit of an aperture value is set in an adjustable range of the aperture value of a taking lens in order to improve photographing characteristics in taking photographs with flash light. For example, in Japanese Patent Laying-Open No. 35328/1987, the lower limit of the aperture value is determined such that even if a lens having a diameter for example (AV=1), is used, the aperture is stopped down smaller than a predetermined diameter, for example, F2.8 (AV=3).

By determining the lower limit of the aperture value as described above, the photographing characteristics in taking photographs with flash light can be improved. However, the object distance in which the brightness can be adjusted by the flash light becomes short, since the diameter of the taking lens is not large enough.

The above described problem will be described in detail in the following. As is well known, the following relation can be applied in which the guide number of the flash apparatus is represented by G, the F number of the aperture is represented by $F_{no.}$, and the object distance providing proper exposure when the flash light is fully emitted from the flash apparatus (that is, the longest object distance in which brightness can be adjusted by the flash light) is represented by D.

$$G = F_{no.} \times D$$

Therefore, if the lower limit in the aperture adjusting range is represented by $F_{low}$ in terms of the F number in taking photographs with flash light, the brightness can be properly adjusted by the flash light only in the range of $D \leq G/F_{low}$. For example, if the lower limit in the aperture adjustable range is F2.8 and the guide number G of the flash apparatus is 28, the brightness of the object can be properly adjusted by the flash light only when the object distance is shorter than or equal to 10 m. If the object is out of this range, the brightness can not be properly adjusted by the flash light.

Various cameras having low brightness-automatic flash emitting function have been known, in which flash photographing mode is automatically selected when the object is dark. In such cameras, whether the photographs should be taken with flash light or with ambient light is determined in accordance with either one of the following conditions.

(a) The shutter speed is slower than a limit for preventing blurring caused by camera shake, corresponding to the focal length of the taking lens, (b) Brightness of the object is darker than a prescribed brightness value.

Table 3 shows values for controlling exposure near the point at which whether the photographing operation is to be carried out with flash light or not is switched in cameras employing the above conditions (a) and (b), respectively, with the flash synchronized shutter speed being TVx=6 (1/60 sec.), as an example.

In the Table, the reference character 35/F4 represents a taking lens whose focal length fl is 35 (mm) and whose full open aperture value AVo is 4 (F4). In the similar manner, the reference character 80/F5.6 represents a taking lens with fl=80 and AVo=5, and the reference character 200/F5.6 represents a taking lens with fl=200 and AVo=5. The reference character TVh represents the slowest shutter speed preventing blurring derived from camera shake The shutter speed TVh is dependent on the focal length fl of the taking lens and it can be represented as $$TVh = \log_2 fl$$

For example, if the focal length fl=35, then $TVh = \log_2 35 \approx 5.1$. The reference characters IV represent maximum intensity (guide number) of the flash light. The maximum intensity (guide number) IV is dependent on the film sensitivity SV of the film and the range of illumination. Since the range of the illumination changes corresponding to the focal length fl, the maximum intensity IV changes corresponding to the film sensitivity SV and the focal length fl. In this example, the film sensitivity SV is selected to be 5 (ISO 100), and when fl $\leq$ 50, IV=2.6 (GNO.14) and when fl>50, then IV=3.6 (GNO.20).

In the (a) type cameras, whether the flash light is to be emitted or not is determined in accordance with the shutter speed TVh preventing the blurring drive from camera shake, and the brightness value BV (switching point) at that time can be calculated by the following equation.

$$BV = TVh + AVo - SV$$

For example, when a lens of 35/F4 is used, $$\begin{aligned} BV &= 5.1 + 4 - 5 \\ &= 4.1 \end{aligned}$$

Similarly, when the lens of 80/F5.6 is used, the brightness value BV is 6.3, and when the lens of 200/F5.6 is used, the brightness value BV is 7.6. In the (b) type cameras, a reference brightness value BV (switching point) is set at 5, which is an intermediate value of the reference values BV in the (a) type cameras.

Based on an assumption that the distribution of brightness of the photographing field is uniform, the ratio of flash light to the ambient light is controlled to be 1:1 in taking photographs with flash light emission. More specifically, the shutter speed TV and the aperture value AV are determined such that the object is under exposed by 1EV when the exposure is controlled only with the ambient light in taking photographs with flash light. In that case, the following relation can be applied with the brightness of the object represented by BV':

$$TV + AV - SV = BV' + 1$$

Since the synchronized shutter speed TVx is set at 6 and the sensitivity of the film SV is set at 5 as mentioned above, the aperture value AV will be $$AV = BV'$$

Near the switching point at which whether the flash light is to be emitted or not is switched, the brightness BV' of the object is equal to BVh in the (a) type cameras and the brightness BV' is 5 in the (b) type cameras Therefore, when a lens of 35/F4 is used, AV=4.1 and TV=6.0 in the (a) type cameras while AV=5.0 and TV=6.0 in the (b) type. The aperture value AV and the shutter speed TV can be calculated in the similar manner when the lens of 80/F5.6 and the lens of 200/F5.6 are used.

The longest object distance D(m) enabling proper photographing operation with flash light can be calculated based on the maximum intensity IV of the flash and the aperture value AV, in accordance with the following equation:

$$\begin{aligned} D &= 2^{DV/2}, \\ DV &= IV + SV - \Delta EVfl - AV \\ &= IV - AV + 7, \end{aligned}$$

where $\Delta EVfl$ is an amount of correction of the flash light, whose value is changed corresponding to the photographing magnification and to the ratio of the flash light to the ambient light. In this example, the ratio of the flash light to the ambient light is assumed to be 1:1 and the photographing magnification is assumed to be small, and therefore $\Delta EVfl = -2$. The amount of correction $\Delta EVfl$ will be described in detail with reference to the embodiments later. When a lens of 30/F4 is used, the longest object distance D in which the brightness can be adjusted is 6.7(m) in the (a) type cameras, and the distance D is 4.9(m) in the (b) type cameras. The object distance D can be calculated in the similar manner when the lens of 80/F5.6 and of 200/F5.6 are used.

As is apparent from Table 3, in the (a) type cameras, the object distance D in which the brightness can be compensated by flash light, that is, in which proper photographing operation with flash light is possible, becomes very short as the focal distance fl of the taking lens becomes longer. For example, the distance D is 6.7 when the focal length fl of the lens is 35 but the distance D is only 2.8 when the focal length fl of the lens is 200. In the latter case, the proper exposure is hardly obtained.

Meanwhile, in the (b) type cameras, the point at which whether the flash light is to be emitted or not is determined is constant (in this example BV=5) regardless of the focal length fl of the lens. Therefore, in the example shown in the table, photographing operation is carried out with ambient light with TV=5 (1/30sec), even if the focal length fl of the lens is as long as 200, so that blurring derived from camera shake is very easy to occur. If the switching point is shifted to the higher brightness side in order to prevent such problem, the flash light may be emitted even though the photographing operation with ambient light is desired, when a lens having large diameter (small full open aperture value AVo) is used.

As described above, in the (a) type cameras, the object distance is very much limited in taking photographs with flash light when the focal length is long. In the (b) type cameras, there is a possibility of blurring derived from camera shake in taking photographs with ambient light when the focal length is long. And, if it is tried to prevent the possibility, then, when a lens having large diameter (small full open aperture value AVo) is used, the flash light may be emitted when photographing operation is to be carried out with ambient light.

SUMMARY OF THE INVENTION

An object of the present invention is to determine an aperture value for improving photographing characteristics in an apparatus for determining an aperture value in taking photographs with flash light.

Another object of the present invention is to determine an aperture value enabling proper photographing operation with flash light of a distant object in an apparatus for determining an aperture value in taking photographs with flash light.

A further object of the present invention is to relieve restrictions on the object distance in taking photographs with flash light when the focal length is long, in a camera having automatic flash emitting function.

A still further object of the present invention is to prevent blurring caused by camera shake in taking photographs with ambient light.

A still further object of the present invention is to prevent undesired emission of flash light when a lens having a large diameter is used.

The above described objects of the present invention can be attained by an apparatus for determining an aperture value in taking photographs with flash light in accordance with the present invention, comprising: full open aperture value inputting means, object distance information inputting means, film sensitivity information inputting means, guide number inputting means, shutter speed information inputting means, brightness measuring means, exposure controlling value determining means, calculating means, aperture value setting means and aperture value determining means. The full open aperture value inputting means inputs a full open aperture value of a taking lens employed. The object distance information inputting means inputs information in association with the object distance. The film sensitivity information inputting means inputs information in association with the film sensitivity. The guide number inputting means inputs guide number of the flash apparatus. The shutter speed information inputting means inputs information in association with the shutter speed. The brightness measuring means measures brightness of an object to be photographed. The exposure controlling value determining means determines the exposure controlling value based on the inputted information in association with the film sensitivity and on the measured brightness. The calculating means calculates largest aperture value in which proper photographing operation with flash light is possible, based on the inputted information in association with the object distance, the information in association with the film sensitivity and on the guide number. The aperture value setting means set an aperture value larger than or equal to the full open aperture value. The aperture value determining means determines an aperture value based on the information in association with the shutter speed and the exposure controlling value in a range larger than the aperture value set by the aperture value setting means when the prescribed aperture value is less than or equal to the maximum aperture value and in the range larger than the maximum aperture value when the set aperture value is larger than the maximum aperture value.

The aperture value determining apparatus structured as described above determines an aperture value in a prescribed range based on the information in association with the shutter speed and on the exposure controlling value, so that a suitable aperture value is determined in taking photographs with flash light.

The above described object of the present invention can be attained by a camera having automatic flash emitting function in which the brightness of the object is measured and when the measured brightness is lower than a prescribed value, photographing mode is switched to a flash photographing mode for emitting flash light, comprising a focal plane shutter, input means, detecting means and determining means. The input means inputs information in association with the focal length of the taking lens. The detecting means detects a limiting shutter speed preventing blurring derived from camera shake based on the inputted information in association with the focal length. The determining means determines the said prescribed value based on the slower one of a flash synchronized shutter speed of the focal plane shutter or the said limiting shutter speed.

Since the camera having automatic flash emitting function structured as described above controls emission of flash light while comparing the object brightness with value based on the synchronized shutter speed and the limiting shutter speed, proper photographing operation becomes possible under wider variety of photographing conditions.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A camera in accordance with one embodiment of the present invention will be hereinafter described with reference to the figures.

Figure 1:
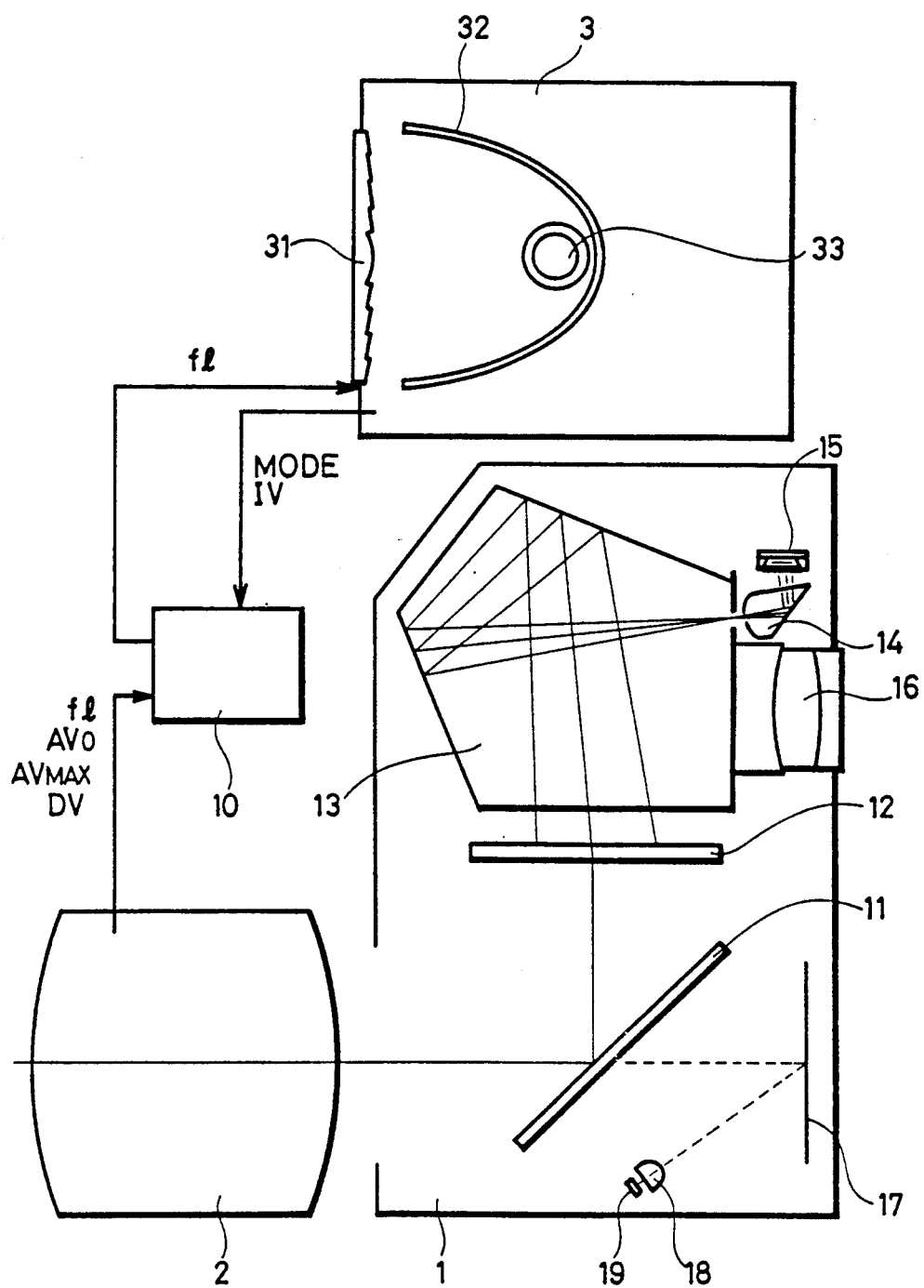
FIG. 1 shows a whole structure of a camera system in accordance with one embodiment of the present invention.

FIG. 1 shows a whole structure of a camera system in accordance with one embodiment of the present invention. The camera system comprises a camera body 1, a taking lens and a flash apparatus 3.

Figure 2:
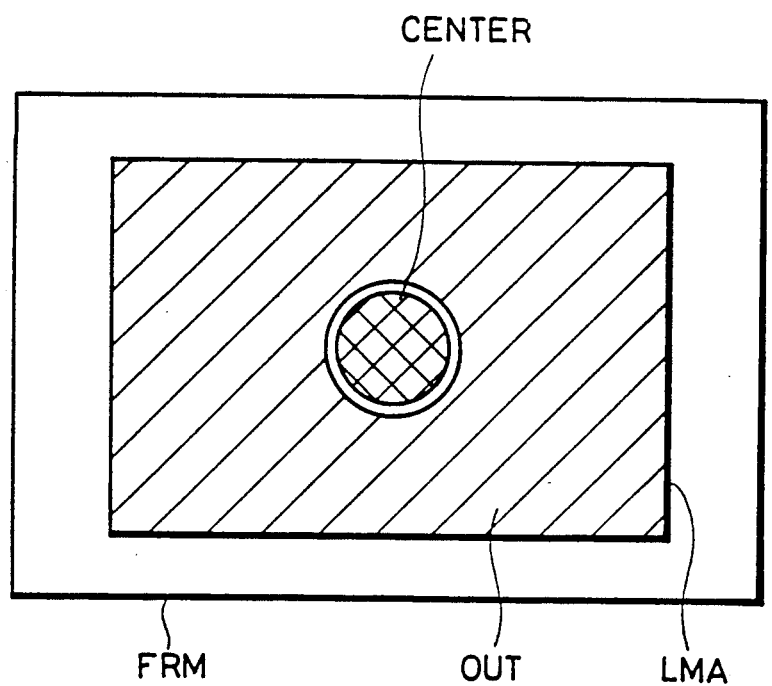
FIG. 2 shows a brightness measuring area and photographing area of a camera system of FIG. 1.

The camera body 1 is a well-known single lens reflex camera having a focal plane shutter As shown in the figure, brightness measuring means 15 is arranged above a finder 16 and brightness measuring means 19 is arranged in the lower part of the camera body 1. The brightness measuring means 15 measures light from an object which enters through the taking lens 2, reflected by a reflecting mirror 11 and passes through a focusing screen 12, a pentagonal prism 13 and a condenser lens 14. The brightness measuring means 15 is consisted of two brightness measuring elements. Areas whose brightness is measured by respective brightness measuring elements are shown in FIG. 2. More specifically, one brightness measuring elements measures the light entering the circular portion CENTER which is approximately at the center of the object field FRM. The other brightness measuring element measures light entering the area OUT of the rectangular brightness measuring area LMA except the above mentioned circle CENTER. As is disclosed in Japanese patent Laying Open No. 215834/1987, the brightness measuring area LMA may be further divided into a number of areas and the brightness measuring means 15 may comprise brightness measuring elements measuring light entering the respective divided areas.

Now, returning to FIG. 1, the brightness measuring means 19 is used for direct brightness measuring, in which a flash light component of the light from the object entering through the taking lens 2, reflected by the film surface 17 and through a condenser lens 18 is measured. More specifically, the brightness measuring means 19 receives the light reflected from the film surface 17 in a photographing operation with flash light, integrates the received light and when the integrated value reaches a prescribed value, it outputs a signal for stopping emission of the flash light.

An exposure calculating means 10 is included in the camera body 1. The exposure calculating means 10 receives brightness data from the brightness measuring means 15, focal length data fl from the taking lens 2, full open aperture value data AVo, the maximum aperture value (aperture value corresponding to the minimum diameter aperture) data AVmax and the object distance data DV. The exposure calculating means further receives flash emission mode data MODE and the maximum intensity data IV from the flash apparatus 3, and it calculates the exposure controlling value (shutter speed TV and controlling aperture value AV) based on these data Three modes are set in the flash apparatus 3, namely, automatic flash emitting mode, emission forcing mode and non-emission mode.

The flash apparatus 3 receives focal length data fl of the taking lens from the exposure calculating means 10 to change the range of illumination in correspondence with the focal length of the taking lens and to change the maximum intensity IV. The range of illumination is changed by moving a diffusing plate 31, a reflector 32 or a light emitting portion (a xenon tube) 33 in the left or right directions as viewed in FIG. 1. In the camera system of this embodiment, the range of illumination is changed by moving the reflector 32.

A method of calculating an exposure controlling value in the camera system will be described in the following with reference to flow charts shown in FIGS. 3 to 9. In this embodiment, the exposure controlling value is calculated by a microcomputer, not shown, provided in the exposure calculating means 10. The microcomputer starts operation in the step #101 when a brightness measuring switch, not shown, is changed from OFF to ON (the switch turns ON when a release button, not shown, is pressed to a first stroke), and the microcomputer continued its operation while the brightness measuring switch is ON. When the release button, not shown, to press to the second stroke and a release switch (not shown) is turned ON, then the flow proceeds to an exposure controlling routine, not shown, and the exposure is controlled (the shutter and aperture are controlled) in accordance with a known method. In taking photograph with flash light, the flash apparatus 3 is operated to emit an flash light when a running of a first curtain of the shutter is completed or when a second curtain of shutter is to be run.

In this embodiment, an object positioned at the center of the photographing field FRM is regarded as the main object.

First, input/output of various data is carried out (#101 to #104).

The microcomputer receives brightness measuring data BVcenter and BVout from the brightness measuring means 15 (#101). The brightness data BVcenter is the brightness data of the circular area CENTER shown in FIG. 2 while the brightness data BVout is the brightness data in the area OUT shown in FIG. 2. Thereafter, the microcomputer receives the focal length data FL from the taking lens 2, the full open aperture value AVo, the maximum aperture value AVmax and the object distance data DV (#102), outputs information fl in association with the focal length to the flash apparatus 3 (#103), and receives the emission mode data MODE and the maximum intensity data IV from the flash apparatus 3 (#104).

Thereafter, the microcomputer calculates the brightness BVs of the main object (#111 to #115).

First, the microcomputer compares the central brightness data BVcenter with a prescribed value (in this embodiment, 10.5 (APEX value)) (#111). If BVcenter $\leq$ 10.5, then the microcomputer stores the central brightness data BVcenter in a register BV'center (#112), and if BVcenter > 10.5, then the microcomputer stores the above mentioned prescribed value (10.5) in the register BV'center (#113). This is to reduce influence of snow or light sources such as the sun. By this operation, it becomes possible to reproduce characteristics of an object having high brightness.

Thereafter, the microcomputer calculates an amount of correction $\alpha$ of the central brightness value BVcenter for the rear light (#114). The amount of correction $\alpha$ is a function of the degree of rear light $\Delta$BVoc (= BVout − BVcenter) and a photographing magnification $\beta$. The relation between the amount of correction $\alpha$, the degree of rear light $\Delta$BVoc and the photographing magnification $\beta$ is shown in Table 1.

The camera system of the present embodiment comprises a ROM storing the data shown in Table 1, and the microcomputer reads out the amount of correction $\alpha$ from the ROM as needed. The amount of correction $\alpha$ may be calculated every calculation.

As is apparent from the table, the amount of correction $\alpha$ becomes smaller as the degree of rear light $\Delta$BVoc becomes smaller, and when $\Delta$BVoc < 1, the amount of correction $\alpha$ is 0, namely, no correction is carried out. When $\Delta$BVoc is very large ($\Delta$BVoc > 2.75), the amount of correction $\Delta$ becomes smaller The reason for this will be described in the following. When the object is illuminated by a rear light, the brightness of the main object is lower than the brightness of the background, so that the central brightness value BVcenter becomes smaller as the main object becomes larger. More specifically, if the main object becomes larger, the value $\Delta$BVoc becomes larger even when the degree of rear light is the same. Photographing operation is rarely carried out when the degree of rear light is very large. In view of the foregoing, it is natural to assume that the value $\Delta$BVoc becomes large because of the fact that the main object is large and not because of the fact that the degree of rear light is large, when the value $\Delta$BVoc is very large. Therefore, in the camera system of this embodiment, when the value $\Delta$BVoc is very large, it is considered that the main object is large and the central brightness value BVcenter is not very much influenced by the rear light, and therefore the amount of correction $\alpha$ is made smaller.

As is apparent from the table, when correction is carried out, the amount of correction $\alpha$ becomes smaller as the photographing magnification $\beta$ becomes larger. The reason is that when the photographing magnification $\beta$ is large, the ratio of an area occupied by the main object to the object field FRM becomes large, so that the central brightness value BVcenter is not very much influenced by the rear light. When the photographing magnification $\beta$ is very small ($\beta < 1/100$), no correction is carried out. Namely, $\alpha = 0$. The reason is that it is natural to regard the main object as a part of the background, when the photographing magnification $\beta$ is very small.

The photographing magnification $\beta$ can be calculated from the focal length fl inputted from the taking lens 2 and the object distance data DV in accordance with the following equation.

$$\beta = fl \cdot 2^{-DV}$$

When the amount of correction $\alpha$ is calculated, the microcomputer subtracts the amount of correction $\alpha$ from the value stored in the register BV'cener, and the resulting value BV'center $-\alpha$ is employed as the brightness of the main object BVs (#115).

$$BVs = BV'center - \alpha$$

Thereafter, the microcomputer calculates the brightness of the background BVa (#121 to #123).

Figure 4:
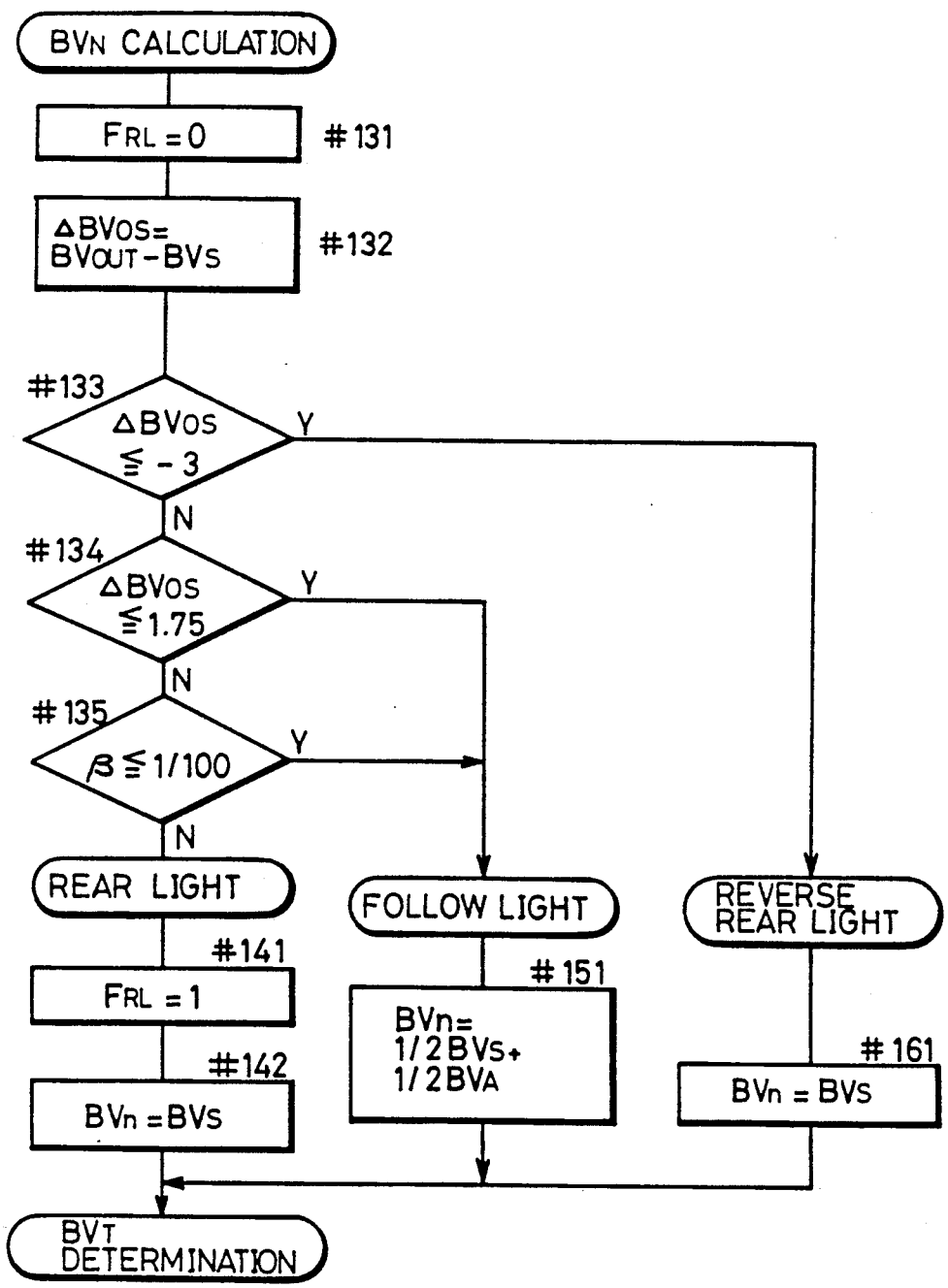
FIG. 4 is a flow chart in association with a process of calculating a controlling brightness for photographing with ambient light, out of the flow of calculating exposure controlling value in the camera system of FIG. 1.
Figure 5:
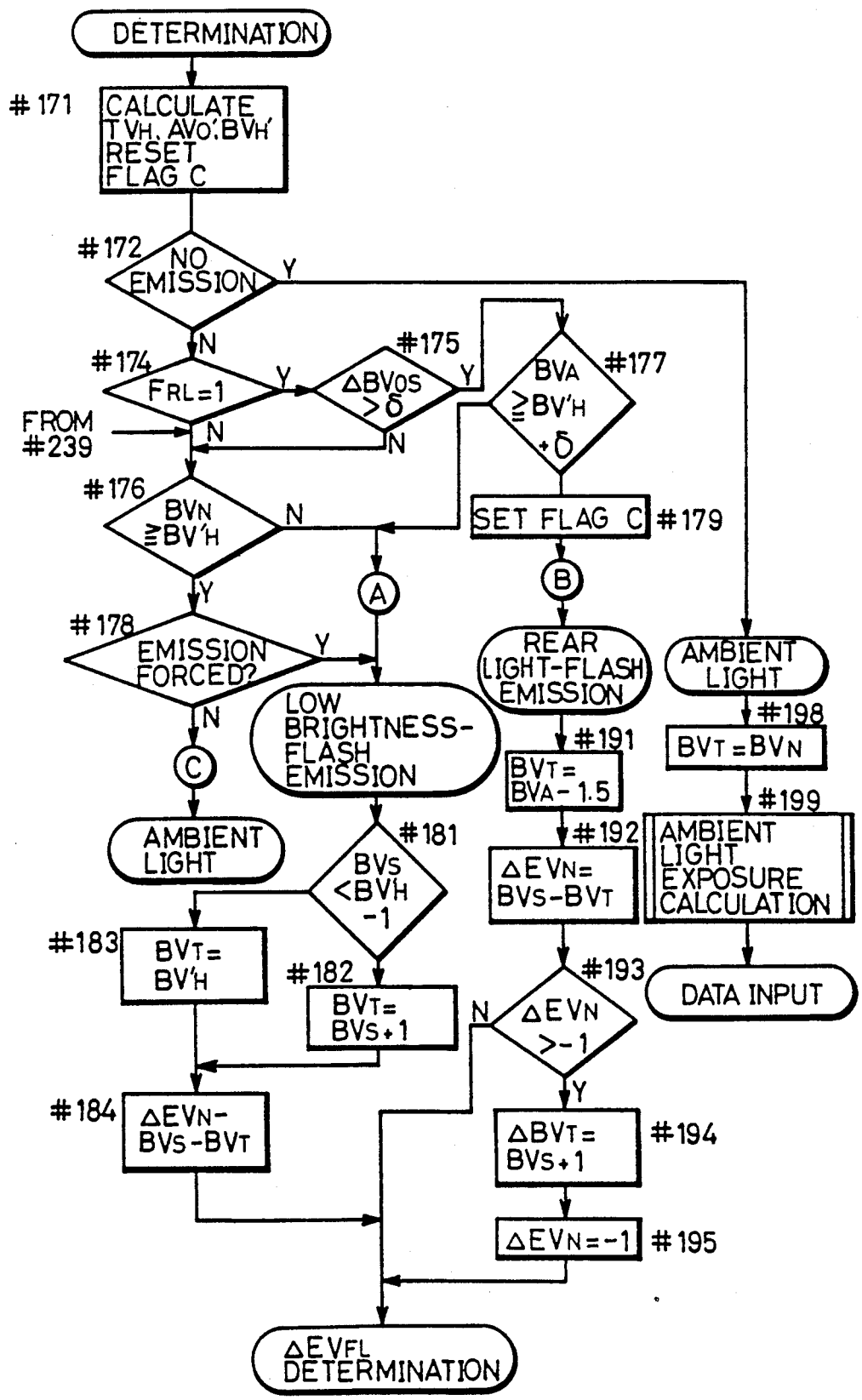
FIG. 5 is a flow chart in association with a process of calculating a brightness value for controlling exposure out of the flow of calculating the exposure controlling value in the camera system of FIG. 1.

First, the microcomputer compares that peripheral brightness data BVout with a prescribed value (in this embodiment, 10 (APEX value)) (#121). If BVout < 10, then the microcomputer employs the peripheral brightness value BVout as the background brightness BVa (#122). Namely, BVa = BVout. Meanwhile, if BVout > 10, then the prescribed value is employed as the background brightness BVa (#123). Namely, BVa = 10. The reason for this is the same as the reason described with reference to the step #113. After the calculation of the main object brightness BVs and the background brightness BVa, the microcomputer calculates a controlling brightness BVn for taking photographs with ambient light (FIG. 4, #131 to #161).

The microcomputer resets a rear light flag Frl (#131). Thereafter, the microcomputer calculates a difference ΔBVos (=BVout−BVs) between the peripheral brightness data BVout and the main object brightness BVs (#132). Thereafter, the microcomputer checks distribution of brightness of the photographing field (#133, #134).

In #133, the microcomputer determines whether or not the main object is very bright compared with the background (such situation occurs when a spot light illuminates a main object in a dark room: this state is in contrast to the rear light state, so that such state will be hereinafter referred to as a reverse rear light state in this specification). More specifically, if ΔBVos < −3, then the microcomputer determines that the photographing field is in the reverse rear light state, and sets the controlling brightness BVn for ambient light photographing operation at the main object brightness BVs (#161).

Meanwhile, if ΔBVos > −3 in #133, namely, if it is not in the reverse rear light state, the microcomputer determines whether the photographing field is in the rear light state or not (#134). Namely, if ΔBVos > 1.75, then the microcomputer determines that the photographing field is in the rear light state and the flow proceeds to the step #135. If ΔBVos ≦ 1.75 namely, −3 ≦ ΔBVos ≦ 1.75, then the microcomputer determines that the photographing field is in the follow light state, and the flow proceeds to the step #151.

If the photographing field is in the rear light state, the microcomputer checks the photographing magnification β (#135), and if the photographing magnification β is very small (β ≦ 1/100), then the flow proceeds to the step #151 where the same calculation as in the follow light state is carried out. The reason for this is that the main object should be regarded as a part of the background when the main object is very small, as described above.

If the photographing field is in the rear light state, the microcomputer sets the rear light flag Frl (#141) and sets the controlling brightness BVn for ambient light photographing operation at the main object brightness BVs (#142). Namely, BVn=BVs.

In the follow light state, the microcomputer sets the controlling brightness BVn for ambient light photographing operation at an average brightness of the photographing range (#151). Namely, BVn=(BVs+BVa)/2. In the follow light state, a weighted average value with the value at the central portion weighted much may be used as the controlling brightness BVn for ambient light photographing operation in order to more properly expose the main object. Namely, $$BVn = \omega BVs + (1-\omega)BVa (0 \leq \omega \leq 1).$$

By doing so, the exposure controlling value is calculated by center weighted average brightness measuring in the follow light state.

As described above, if the photographing field is in the rear light state or in the reverse rear light state, then the exposure controlling value BVn for ambient light photographing operation is calculated based only on the main object brightness BVs, namely, by spot measuring. If the photographing field is in the follow light state or when the photographing field is in the rear light state and the photographing magnification is small, then the exposure controlling value BVn for ambient light photographing operation is calculated by average brightness measuring or by center weighted average brightness measuring. Therefore, in the rear light state or in the reverse rear light state, the exposure can be controlled independent from the influence of the background brightness. In the follow light state or in the rear light state with small photographing magnification, unstability of the brightness measuring output derived from the fact that the center brightness measuring area CENTER is small or errors derived from the difference between the reflection factor of the objects (for example, errors generated when a person in white or black is photographed) can be prevented, since the brightness of the most part of the photographing range is measured.

After the calculation of the controlling brightness BVn for ambient light photographing operation, the microcomputer determines whether or not the flash light is to be emitted (#171 to #179, see FIG. 5) and calculates a brightness value BVt for actually controlling exposure (#181 to #199).

First, the microcomputer calculates the limiting shutter speed TVh preventing blurring derived from camera shake, the minimum aperture value (aperture value for the maximum opening) AV'o for photographing operation with flash light and the limiting brightness value BVh, the switching point preventing blurring derived from camera shake, and the flag C is reset (#171).

The limiting shutter speed (there is a possibility of blurring derived from camera shake if the shutter speed is slower than this value) is approximately the inverse 1/fl (sec) of the focal length fl (mm). Therefore, the shutter speed TVh can be calculated by the following equation, based on the focal length data fl of the taking lens 2.

$$TVh = \log_2 fl$$

As is apparent from the foregoing, as the focal length of the taking lens becomes longer, the shutter speed TVh preventing blurring derived from camera shake becomes faster. For example, if fl=35(mm), then the shutter speed TVh=5.1, if fl=80(mm), then TVh=6.3, and if fl=200, then TVh=7.6 (see Table 3).

The minimum aperture value AV'o in taking photographs with flash light is either the full open aperture value AVo of the taking lens 2 or a prescribed value (in this embodiment, 3 (APEX value, F 2.8)), which is not smaller, namely, $$AV'o = max(AVo, 3).$$

The reason for this is that the photographing characteristic is degraded when the aperture diameter becomes large. In order to improve photographing characteristics as much as possible, a lower limit is provided for the aperture value in taking photographs with flash light (in this embodiment, 3 (F 2.8)), preventing degradation in photographing characteristics.

The limiting brightness value BVh' preventing blurring derived from the camera shake can be calculated in accordance with the following equation. Namely $$BVh' = TVh' + AVo' - SV.$$

where TVh' is either the limiting shutter speed TVh preventing blurring derived from a camera shake or a flash synchronized shutter speed TVx (in this embodiment, TVx=6 (1/60sec.)), which is not larger. Namely, $$TVh' = min(TVh, TVx).$$

The flag C is set when emission of flash light is necessary in the rear light state, and otherwise the flag C is reset.

Even if it is determined in the steps #134 and #135 that the photographing field in the rear light state (that is, even if the rear light flag Frl is set), it is determined based on the degree of rear light ΔBVos whether the exposure is to be controlled based on the spot measured value (that is, the central brightness value BVcenter) only with the ambient light without using the flash light or the exposure is to be controlled with the flash light, as will be described later. In the camera system of the present embodiment, the reference δ for this selection is dependent on the object brightness BVs, and it becomes larger as the object brightness BVs becomes higher. More specifically, the reference δ is defined as follows:
$\delta = (BVs - 6)/16 + 2.5$ When the photographing field is in the rear light state and the brightness of the main object is high, there is a high possibility of improper exposure of the main object, since the correction of the brightness by the flash light becomes impossible. However, in the camera system of the present embodiment, the reference δ for selection becomes larger as the brightness of the main object BVs becomes higher, as described above. Therefore, if the brightness of the main object BVs is high, the possibility of emitting flash light is reduced, and therefore the possibility of improper exposure of the main object is reduced.

After the initialization(#171), the microcomputer determines whether the mode of the flash apparatus 3 is the non-emission mode or not, namely, whether or not the flash apparatus 3 is attached and the power is turned on (#172). If the flash apparatus 3 is not attached or if the power is not turned on (that is, the flash apparatus 3 is in the non-emission mode), then the control of the microcomputer proceeds to the ambient light routine (#198, #199).

In the ambient light routine, the microcomputer sets the brightness value BVt for controlling exposure at the previously calculated controlling brightness BVn for ambient light photographing operation (#198). More specifically, BVt=BVn. The microcomputer calculates the aperture value AV and the shutter speed TV by a known method (for example, in accordance with a prescribed program line) based on the brightness value BVt for exposure control (#199). Thereafter, the flow returns to the step #101 of the flow chart shown in FIG. 3.

As is apparent from the foregoing, in the camera system of the present embodiment, when the photographing operation is carried out with ambient light, the exposure is controlled by spot metering under the rear light state or the reverse rear light state, and it is controlled by average brightness measuring under the follow light state.

If it is determined that the flash apparatus 3 is attached and the power is on (namely, the apparatus 3 is in the emission forcing mode or in the automatic flash emission mode) in the step #172, then the control of the microcomputer proceeds to the step #174 in which whether the photographing field is in the rear light state or not is determined. If the rear light flag Frl is set, then the flow proceeds to the step #175 in which the degree of rear light ΔBVos is compared with the said reference δ. If ΔBVos>67, the flow proceeds to the step #177. Otherwise, the flow proceeds to the step #176. Meanwhile, if the photographing field is not in the rear light state, that is, if the rear light flag Frl is not set, then the flow proceeds to the step #176.

In the step #176, the microcomputer carries out determination of the low brightness automatic flash emission. More specifically, the microcomputer compares brightness value BVn for controlling ambient light photographing operation with the limiting brightness value BVh' preventing blurring derived from camera shake calculated in #171. If BVn<BVh', the microcomputer determines that there will be a blurring caused by a camera shake when the photographing operation is carried out with ambient light, since the brightness of the object is low, and the flow proceeds to the low brightness flash emitting routine (#181 to #184). If BVn≧BVh' in #176, then the microcomputer determines that the object is bright enough and that there is no possibility of blurring, and the flow proceeds to the step #178. In the step #178, the microcomputer checks the emission mode of the flash apparatus 3. If it is in the emission forcing mode, then the flow proceeds to the low brightness flash emission routine. Otherwise, namely, if the mode is in the automatic emission mode, then the flow proceeds to the ambient light routine (#198, #199).

If it is determined that the photographing operation is to be carried out with flash light for the object being in the rear light state in the step #175, the flow proceeds to the step #177, then the microcomputer determines whether or not the background is bright. If the background is bright, that is, BVa≧BVh'+67, then the flow proceeds to the step #179 where the microcomputer sets the flag C indicating that the photographing operation is carried out with flash light in the rear light state, and the flow proceeds to the rear light automatic flash emission routine (#191 to #194). Meanwhile, if the background is dark, that is, BVa<BVh' +67, then the flow proceeds to the low brightness automatic flash emission routine (#181 to #184).

Figure 10:
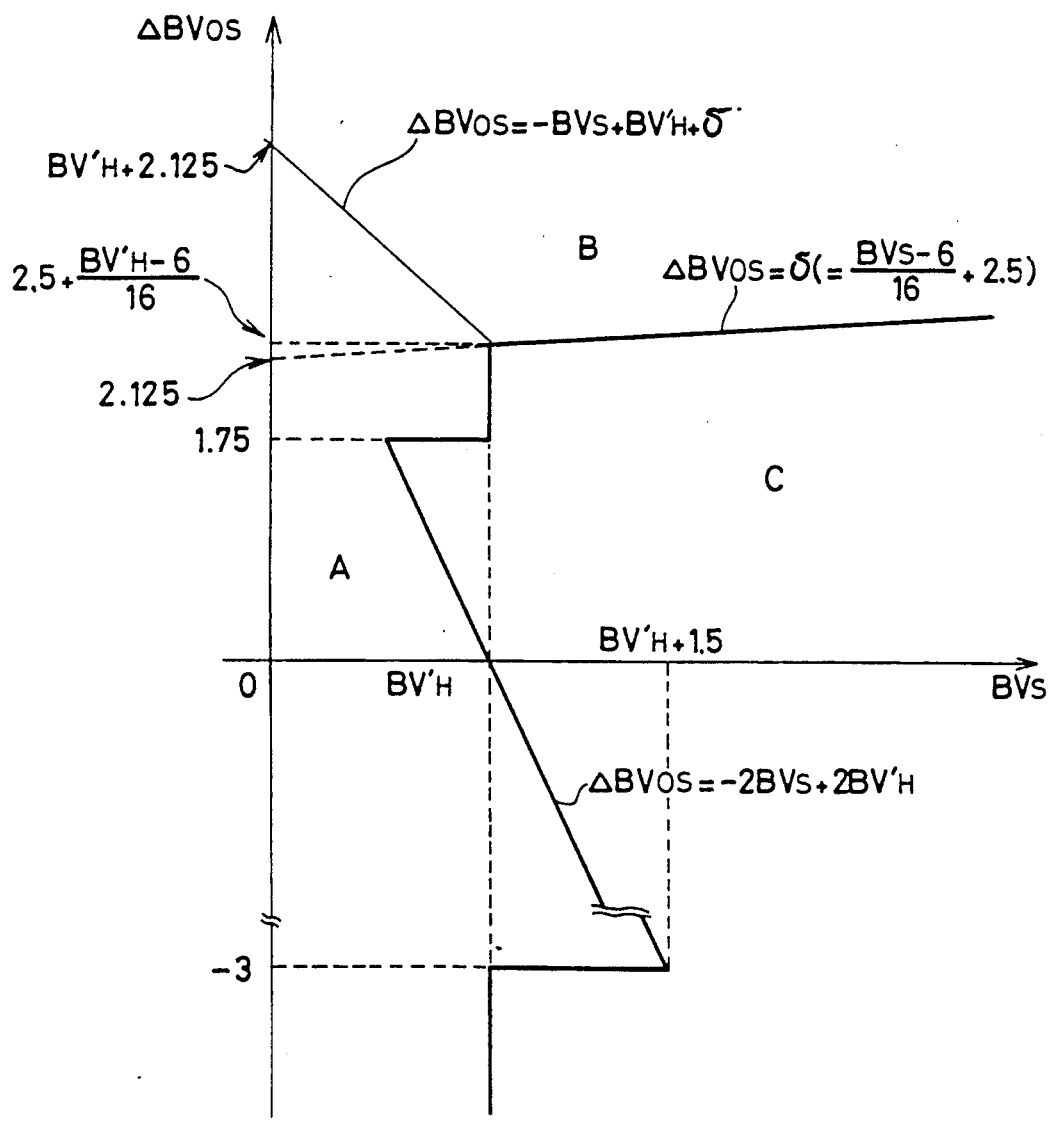
FIG. 10 shows references for determining whether the flash light is to be emitted or not in an automatic flash emitting mode of the camera system in accordance with one embodiment of the present invention.

The relation between the main object brightness BVs and the brightness difference ΔBVos and whether the emission of flash is necessary or not in the automatic flash emission mode is shown in FIG. 10. In the figure, the abscissa represent the main object brightness BVs and the ordinate represents the brightness difference ΔBVos. The area A corresponds to the low brightness automatic flash emission routine, the area B corresponds to the rear light automatic flash emission routine and the area C corresponds to the ambient light routine. It is assumed that the brightness of the peripheral portion is low and BVa=BVout (see #121 and #122 in FIG. 3).

In accordance with the determining boundary $$BVa = BVh' + \delta$$

In the step #177, the boundary between the areas A and B will be $$\Delta BVos = BVout - BVs$$
$$= BVa - BVs$$
$$= BVh' + \delta - BVs.$$

The boundary between the areas B and C will be $$BVos = \delta$$

in accordance with the determining boundary in #175. The boundary between the areas A and C can be determined by the determining boundary in the step #176, that is, $$BVn = BVh'$$

However, since the following relation can be applied as follows (see FIG. 4):

$$BVn = \frac{BVs + BVa}{2}$$
$$(\text{for } -3 < \Delta BVoc \leq 1.75),$$
$$= BVs$$
$$(\text{for } \Delta BVos \leq -3 \text{ or } \Delta BVos > 1.75),$$

the boundary will be $$BVs = BVh'$$
$$(\text{for } \Delta BVos \leq -3 \text{ or } \Delta BVos > 1.75),$$
$$\Delta BVos = BVout - BVs$$
$$= BVa - BVs$$
$$= (2 BVn - BVs) - BVs$$
$$= 2 BVn - 2 BVs$$
$$= -2 BVs + 2 BVh'$$
$$(\text{for } -3 < \Delta BVos \leq 1.75)$$

The method for calculating the brightness value BVt for controlling exposure in taking photographs with flash light will be described in the following.

First, the low brightness flash emission (including emission forcing mode) will be described. In the low brightness flash emission mode, the shutter speed TV and the aperture value AV are determined such that the main object is under exposed by 1EV with ambient light alone, and the short amount of light is compensated by the flash light. By doing so, over exposure of the main object caused by the ambient light and the flash light can be prevented. However, if the calculated shutter speed is too slow to prevent blurring derived from a camera shake, then the brightness value BVt for controlling exposure is determined so as to reduce the possibility of the camera shake.

More specifically, the microcomputer judges whether or not there is a possibility of camera shake if the brightness value BVt for controlling exposure is determined so that the main object is under exposed by 1EV with the ambient light (#181), and then the microcomputer determines. Namely, the main object brightness BVs is checked and if $BVs < (BVh' - 1)$, then the microcomputer determines that there is a possibility of camera shake. Consequently, the flow proceeds to the step #183 in which the brightness value BVt for controlling exposure is set at the limiting brightness value BVh' preventing the camera shake, so as to reduce the possibility of camera shake. Namely, $BVt = BVh'$. On this occasion, the main object will be under exposed by more than 1EV when the photograph is taken only with a ambient light. Meanwhile, if there is no possibility of camera shake in #181, the flow proceeds to the step #182 in which the brightness value BVt for controlling exposure is set to be $$BVt = BVs + 1$$

so that the main object will be under exposed by 1EV when it is photographed with ambient light alone. After the brightness value BVt for controlling exposure is determined, the microcomputer calculates an exposure value $\Delta EVn (= BVs - BVt)$ corresponding to the ratio of the ambient light component to the proper exposure (#184).

Meanwhile, in the rear light flash emission mode, the brightness value BVt for controlling exposure is determined such that the background is over exposed by 1.5EV so that the characteristics of the rear light state are well reproduced in the photograph. Therefore, the microcomputer sets the brightness value BVt for controlling exposure as $$BVT = BVa - 1.5$$

in consideration of the fact that the flash light does not reach the background (#191). Thereafter, the microcomputer calculates the exposure value $\Delta EVn$ corresponding to the ratio of the ambient light component to the proper exposure (#192).

Now, when the flash light is emitted with the ratio of the ambient light component to the proper exposure being large, the main object may be over exposed. Therefore, in the camera system of the present embodiment, whether the ratio of the ambient light component to the proper exposure is large or not is determined (#193). If there is a possibility of over exposure of the main object, then the brightness value BVt for controlling exposure is set again so that the main object is under exposed by 1EV when it is photographed only with the ambient light as in the case of the low brightness flash emission, for the proper exposure of the main object (#194). Thereafter, the exposure value $\Delta EVn$ corresponding to the ratio of the ambient light component to the proper exposure is again calculated (#195).

In view of the foregoing, in the camera system of the present embodiment, the exposure value $\Delta EVn$ is always set to be $\Delta EVn \leq -1$. Therefore, in the camera system of the present embodiment, the ratio of the ambient light $2^{\Delta EVn}$ in taking photographs with flash light will be $$2^{\Delta EVn} \leq 2^{-1} = 0.5.$$

and therefore, the ratio of the ambient light component to the proper exposure is less than or equal to one half.

Figure 6:
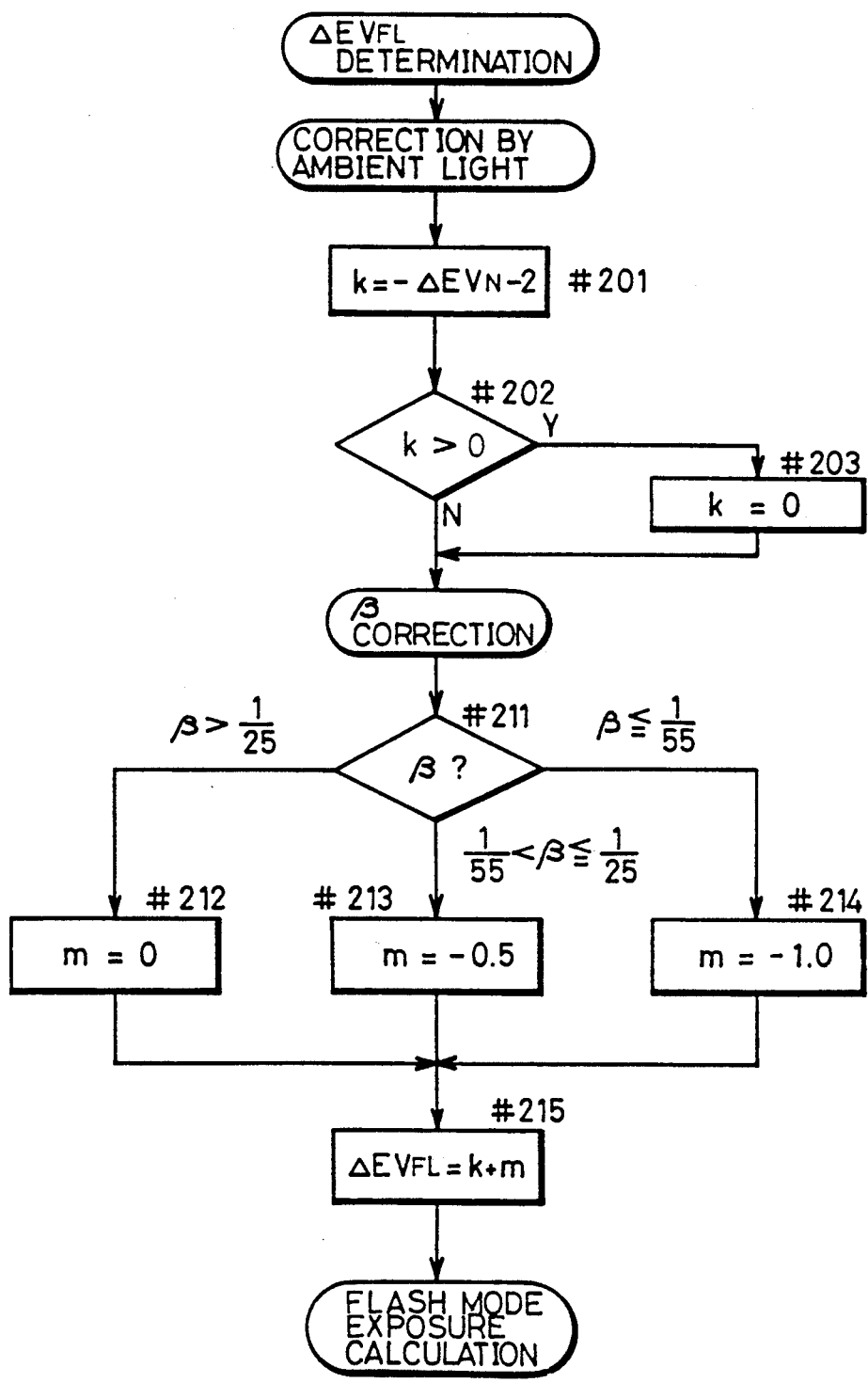
FIG. 6 is a flow chart in association with determination of an amount of correcting flash light out of the flow of calculating the exposure controlling value in the camera system of FIG. 1.

After the calculation of the brightness value BVt for controlling exposure and of the exposure value $\Delta EVn$ corresponding to the ratio of the ambient light to the proper exposure, the control of the microcomputer proceeds to a routine for determining the flash correcting amount $\Delta EVfl$ (FIG. 6).

As described above, the brightness measuring means 19 measures the flash light component of light reflected from the film surface 17. When the flash light is controlled such that the exposure of the main object becomes proper with the flash light only, then the main object will be over exposed by the amount corresponding to the ambient light. Therefore, in order to properly expose the main object, the reference integrated value must be corrected such that the brightness measuring means 19 outputs an emission stopping signal before the integrated value of the brightness measuring means 19 reaches the value corresponding to the proper exposure. In addition, the smaller the image of the main object, the more the amount of the flash light which goes to the background without illuminating the main object. Therefore, if the correction is not carried out in accordance with the photographing magnification $\beta$, the possibility of over exposure of the main object will become larger as the image of the main object becomes smaller (that is, that photographing magnification $\beta$ becomes smaller).

Therefore, in the camera system of the present embodiment, the flash correcting amount k in accordance with the ambient light component and the flash correcting amount m in accordance with the photographing magnification $\beta$ are calculated and by correcting the flash light in accordance with these amounts, the main object is always exposed properly independent from ambient light component or the photographing magnification $\beta$.

At first, the microcomputer calculates the flash correcting amount k in accordance with the ambient light component (#201 to #203). The amount of correction k can be represented as $$k = \log_2(1 - 2^{\Delta EVn})$$

For example, when there is no ambient light component, ($\Delta EVn = -\infty$), then k=0, so that the main object must be properly exposed only by the flash light without correcting the flash light, in order to properly expose the main object. When the main object is under exposed by 1EV with the ambient light only ($\Delta EVn = 1$), then k=1, so that the intensity of the flash must be corrected such that the main object will be under exposed by 1EV with the flash light only, in order to properly expose the main object with the ambient light and the flash light. When the main object is properly exposed only with the ambient light ($\Delta EVn = 0$), then k = $-\infty$, so that the flash light is unnecessary to properly expose the main object.

Although the flash correcting amount k can be calculated in accordance with the complicated equation described in the foregoing, the flash correcting amount k is calculated in the camera system of the present embodiment by linear approximation of the above equation, that is, $$k = -\Delta EVn - 2 (for\ k \leq 0)$$

$$k = 0 (for\ k > 0)$$

(#201 to #203).

Thereafter, the microcomputer calculates the flash correcting amount m in accordance with the photographing magnification $\beta$. First, the microcomputer checks the value of the photographing magnification $\beta$ (#211) and determines the correcting amount m in accordance with the photographing magnification $\beta$ in the following manner.

$$m = 0 \quad \left(for\ \beta > \frac{1}{25}, \#212\right)$$

$$m = -0.5 \quad \left(for\ \frac{1}{55} < \beta \leq \frac{1}{25}, \#213\right)$$

$$m = -1.0 \quad \left(for\ \beta \leq \frac{1}{55}, \#214\right)$$

As the photographing magnification $\beta$ becomes smaller, the absolute value $|m|$ of the correcting amount m becomes larger and the intensity of the flash is reduced.

After the determination of the flash correcting amounts k and m, the microcomputer adds the both correcting amounts to determine the flash correcting amount $\Delta EVfl$ (#215). Namely $$\Delta EVfl = k + m$$

After the determination of the flash correcting amount $\Delta EVfl$, the control of the microcomputer proceeds to the flash mode exposure calculating routine (FIG. 7) in which the shutter speed TV and the aperture value AV for controlling the exposure are calculated.

At first, the microcomputer corrects the information SV in association with the film sensitivity in order to correct the reference integrated value for the brightness measuring means 19 to output the emission stopping signal, so as to provide the corrected value SV' (#221), that is, $$SV' = SV - \Delta EVfl.$$

Thereafter, the microcomputer carries out an FM (flashmatic, follow focus) operation to find the maximum aperture value AVd at which the object can be properly exposed with flash light (#222), that is, $$AVd = IV + SV' - DV$$

where IV is the maximum intensity of the flash apparatus and DV is the object distance represented in the APEX system (DV = $\log_2 D$, D: object distance).

Thereafter, the microcomputer substitutes either the maximum aperture value AVd calculated at step #222 or the maximum aperture value AVmax (the aperture value for the smallest diameter aperture) of the taking lens 2, which is not greater, for the calculated maximum aperture value AVd (#223). Namely $$AVd = min(AVd, AVmax),$$

which means that the aperture cannot be made smaller than that corresponding to the maximum aperture value AVmax and therefore the maximum aperture value AVmax is substantially the maximum aperture value AVd at which the object can be properly exposed with flash light, when AVd > AVmax.

Thereafter, the microcomputer determines whether the object can be properly exposed with flash light or not (#224, #231).

At first, the microcomputer compares the aperture value AVd which is determined at the step #223 with the full open aperture value AVo of the taking lens 2 (#224) in order to determine whether the amount of the flash light is enough or not. If AVd < AVo, the microcomputer determines that the amount of the flash light is short, and the flow proceeds to the step #225. The state with (AVd<AVo) means that the object is too far or the maximum intensity IV of the flash apparatus 3 is too small and therefore the amount of the flash light is short unless the aperture is opened to a larger diameter than the full open aperture. If AVd≧AVo, then the microcomputer determines that the amount of the flash light is enough, and the flow proceeds to the step #231.

If it is determined that the amount of the flash light is short in the step #224, then the microcomputer sets the aperture value AVd at the full open aperture value AVo so that the amount of the flash light is as large as possible (#225). Thereafter, the microcomputer determines whether the photographing operation is the rear light flash photographing or not (#226). Namely, if the flag C is set, the microcomputer determines that it is the rear light flash photographing operation and the flow proceeds to the step #239. Otherwise, the flow proceeds to the step #231. In the step #239, the microcomputer resets the flag C and stops the rear light flash photographing operation to go to the step #176.

In the step #231, the microcomputer determines whether the proper flash photographing operation is possible or not based on the brightness value BVt (see FIG. 5) for controlling the exposure calculated previously. The maximum brightness value with which the proper exposure is obtained in the flash photography is defined as the proper brightness value when the shutter speed is set at the flash synchronized shutter speed TVx and the aperture value is set at the maximum aperture value AVd at which the amount of the flash light is enough, that is, $TVx + AVd - SV.$ Therefore, if $BVt > TVx + AVd - SV$ then, the photographing operation with flash light cannot be properly carried out, since the brightness value BVt for controlling the exposure is too large. If the microcomputer determines that the photographing operation with flash light cannot be carried out properly based on the brightness value BVt for controlling the exposure calculated in advance, the flow proceeds to the step #232. Otherwise, the flow proceeds to the aperture adjusting range determining routine (FIG. 8).

In #232, the microcomputer determines whether the operation is the rear light flash photographing operation or not. If the flag C is not set, then the microcomputer determines that it is not flash photographing operation in the state of the rear light (namely, it is the low brightness flash photographing operation including emission forcing mode), and the flow proceeds to the aperture adjusting range determining routine (FIG. 8). If it is the rear light flash photographing operation, the control of the microcomputer proceeds to the step #233 in which the brightness value BVt for controlling the exposure is set at the maximum brightness value with which the proper exposure is obtained in the flash photography. Namely, $BVt = TVx + AVd - SV.$ Thereafter, the microcomputer compares the reset controlling brightness value BVt with the main object brightness BVs (#234). If BVs<BVt−1, then the flow proceeds to the aperture adjusting range determining routine (FIG. 8). If BVs>BVt−1, the flow proceeds to the step #239.

If BVs>BVt−1, it means that the main object will be over exposed by more than 1EV with the ambient light alone when the exposure is controlled based on the reset brightness value BVt for controlling exposure. Therefore, it is not desired to take photograph under such condition. In view of the foregoing, in the camera system of the present embodiment, the program proceeds to the step #239 to reset the flag C thereby stopping the rear light flash photographing operation, as in the case where the flash light is short. Thereafter, the flow returns to the step #176 of the flow chart shown in FIG. 5 where the controlling value BVt is determined again considering that it is not in the rear light state.

Figure 8:
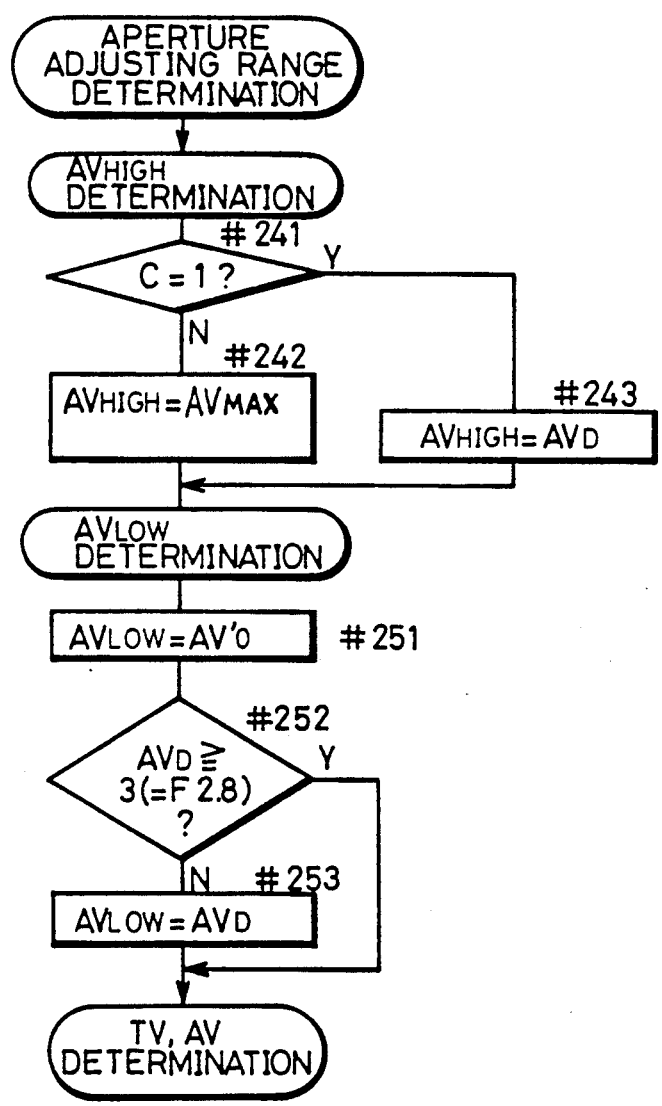
FIG. 8 is a flow chart in association with a process for determining aperture adjusting range out of the flow of calculation of the exposure controlling value in the camera system of FIG. 1.

FIG. 8 is a flow chart showing the aperture adjusting range determining routine.

Entering this routine, the microcomputer determines the upper limit AVhigh of the aperture adjusting range (#241 to #243).

Figure 7:
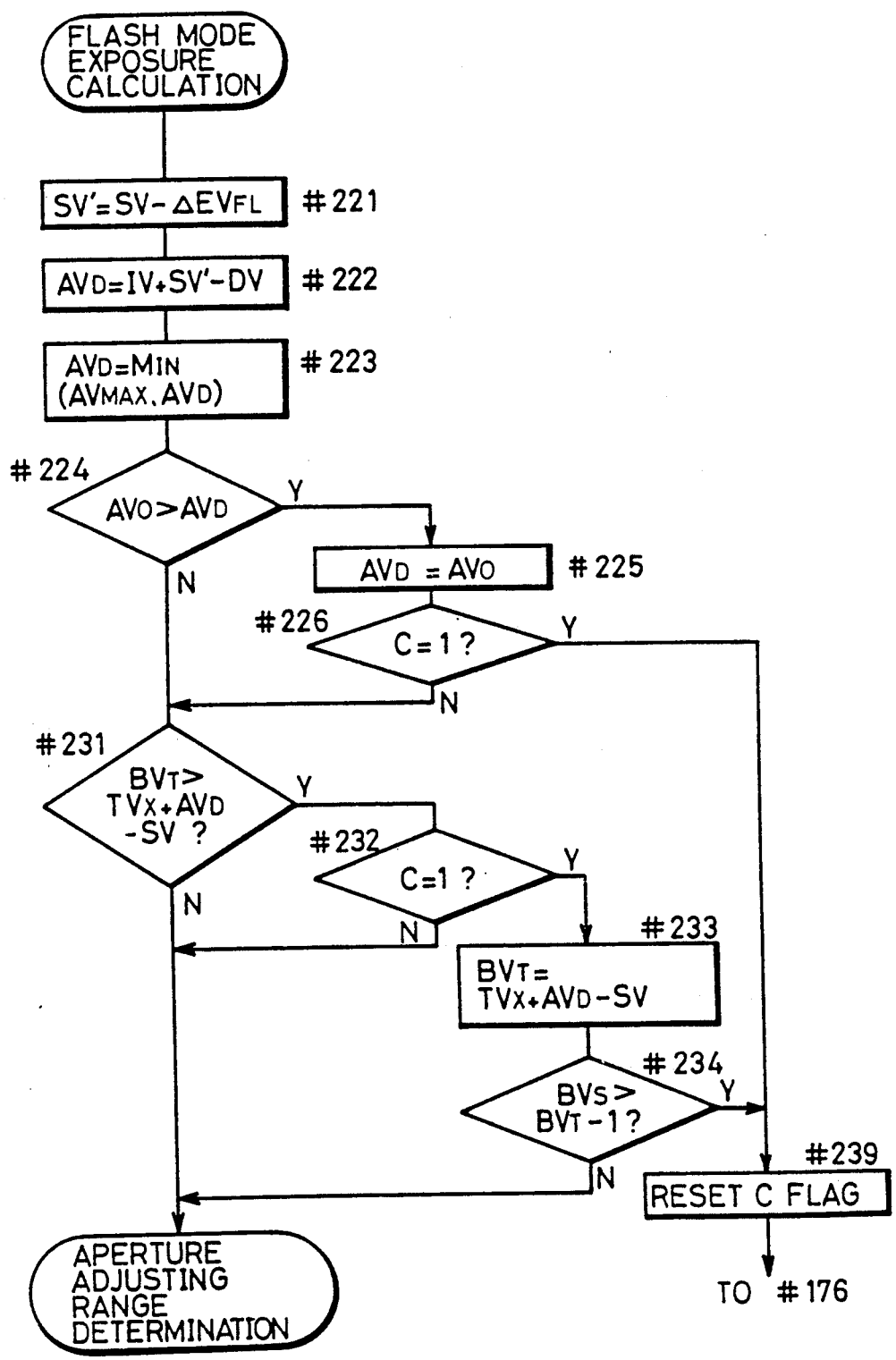
FIG. 7 is a flow chart in association with the exposure calculating process in a flash mode out of the flow of calculating the exposure controlling value in the camera system of FIG. 1.

As is apparent from the steps #231 to #234 of the flow chart shown in FIG. 7, when the flag C is set (in rear light flash photographing operation), the aperture value is never grater than AVd. Therefore, in the camera system of the present embodiment, whether the flag C is set or not is checked (#241) and if the flag C is set, then the upper limit Avhigh is set at the said aperture value AVd (#243). If the flag C is not set (namely, in the low brightness flash photographing operation, including the emission forcing mode), the upper limit AVhigh is set at the maximum aperture value AVmax of the taking lens 2 (#242).

When the brightness of the main object is high (especially in the emission forcing mode), the main object may be over exposed with the ambient light only, even if the shutter speed is set at the synchronizing shutter speed TVx and the aperture value is set at the maximum aperture value AVd for flash photography (see steps #231 and #232 of FIG. 7). However, in the present embodiment, since the upper limit AVhigh of the aperture adjusting range is set at the maximum aperture value AVmax of the taking lens 2 and the exposure is controlled such that the main object is under exposed by 1EV with the ambient light alone (see the step #182) FIG. 5)), the main object is under exposed by 1EV in the worst case, even if the intensity of the flash is not enough.

After the determination of the upper limit AVhigh of the aperture adjusting range, the microcomputer determines the lower limit AVlow of the adjusting range (#251 to #253).

First, the microcomputer sets the lower limit AVlow at the minimum aperture value AVo′ for the photographing operation with flash light described above (#251). The reason for this is that the photographing characteristic is degraded as the aperture diameter becomes large, as described above. By setting the lower limit, photographing operation can be carried out with good photographing characteristic.

When an object is at a distance, the maximum aperture value AVd for the flash photography which was calculated in the step (#222) (FIG. 7) may be larger than the full open aperture value AVo of the taking lens but smaller than the said value AVo′. Therefore, even if the aperture value is set at the lower limit AVlow, the main object may be under exposed. In such a case, proper exposure of the main object should preferably be given priority to the photographing characteristics. Therefore, the microcomputer determines whether the maximum aperture value AVd for the flash photography is larger than the said value AVo' or not (#252). If AVd<AVo', then the lower limit AVlow of the adjusting range is reset at the (#253).

Figure 9:
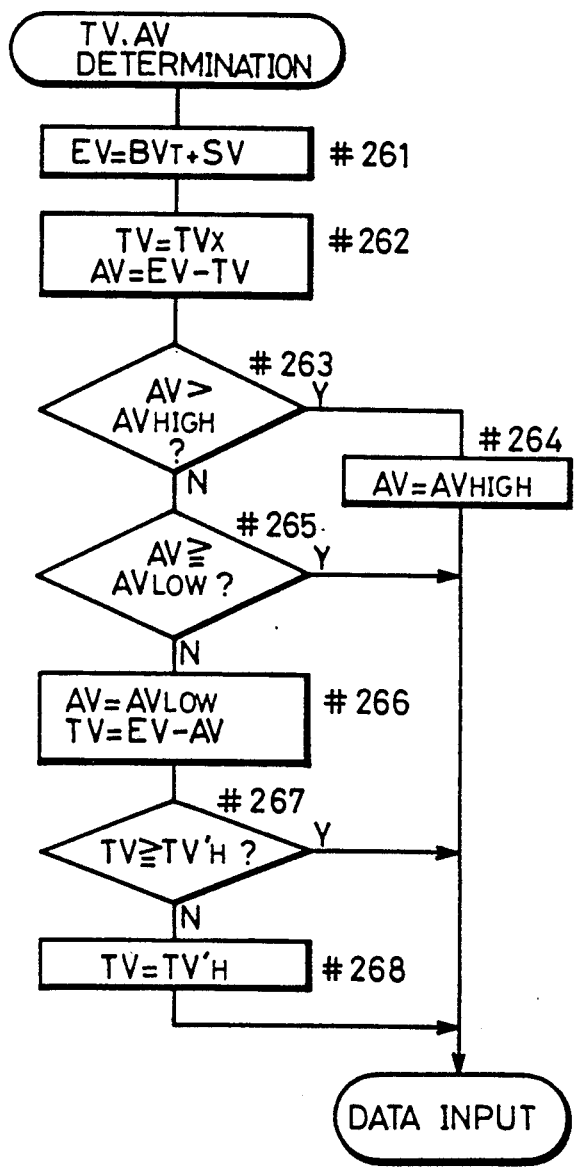
FIG. 9 is a flow chart in association with a process for determining the shutter speed and the aperture value out of the flow of calculation of the exposure controlling value in the camera system of FIG. 1.

After the determination of the aperture adjusting range, the microcomputer calculates the shutter speed TV and the aperture value AV based on the brightness value BVt for controlling exposure (FIG. 9, #261 to #268).

First, the microcomputer calculates the exposure value EV by the ambient light component (#261), that is, $$EV = BVt + SV.$$

Thereafter, the microcomputer sets the shutter speed TV at the synchronized shutter speed TVx and calculates a proper aperture value AV for this situation (#262). Namely, $$TV = TVx,$$
$$AV = EV - TV$$
$$= EV - TVx.$$

Thereafter, the microcomputer determines whether the calculated aperture value AV is in the aperture adjusting range (#263, #265).

First, the calculated aperture value AV is compared with the upper limit AVhigh of the adjusting range (#263), and if AV>AVhigh, then the calculated aperture value AV is reset at the upper limit AVhigh (#264). If AV≦AVhigh, then the microcomputer compares the aperture value AV with the lower limit AVlow (#265). If AV<AVlow, then the calculated aperture value AV is reset at the lower limit AVlow and the microcomputer calculates a proper shutter speed for this situation (#266). That is, $$AV = AVlow,$$
$$TV = EV - AV$$
$$= EV - AVlow.$$

Thereafter, the microcomputer compares the calculated shutter speed TV with the above mentioned value TVh' (=min(TVh, TVx)) (#267). If TV<TVh', then the calculated shutter speed TV is reset at the said value TVh' (#268).

The shutter speed TV and the aperture value AV in taking photographs with flash light are shown in Table 2.

If the photographing operation is carried out with the shutter speed slower than the above mentioned shutter speed TVh', there is a possibility of blurring derived from a camera shake, and the shutter speed TVh' has no relation with the provision of the proper exposure. Therefore, when the photographing operation is to be carried out with a slow shutter speed as in the case of a slow synchronized photographing operation, the steps #267 and #268 may be omitted.

Figure 3:
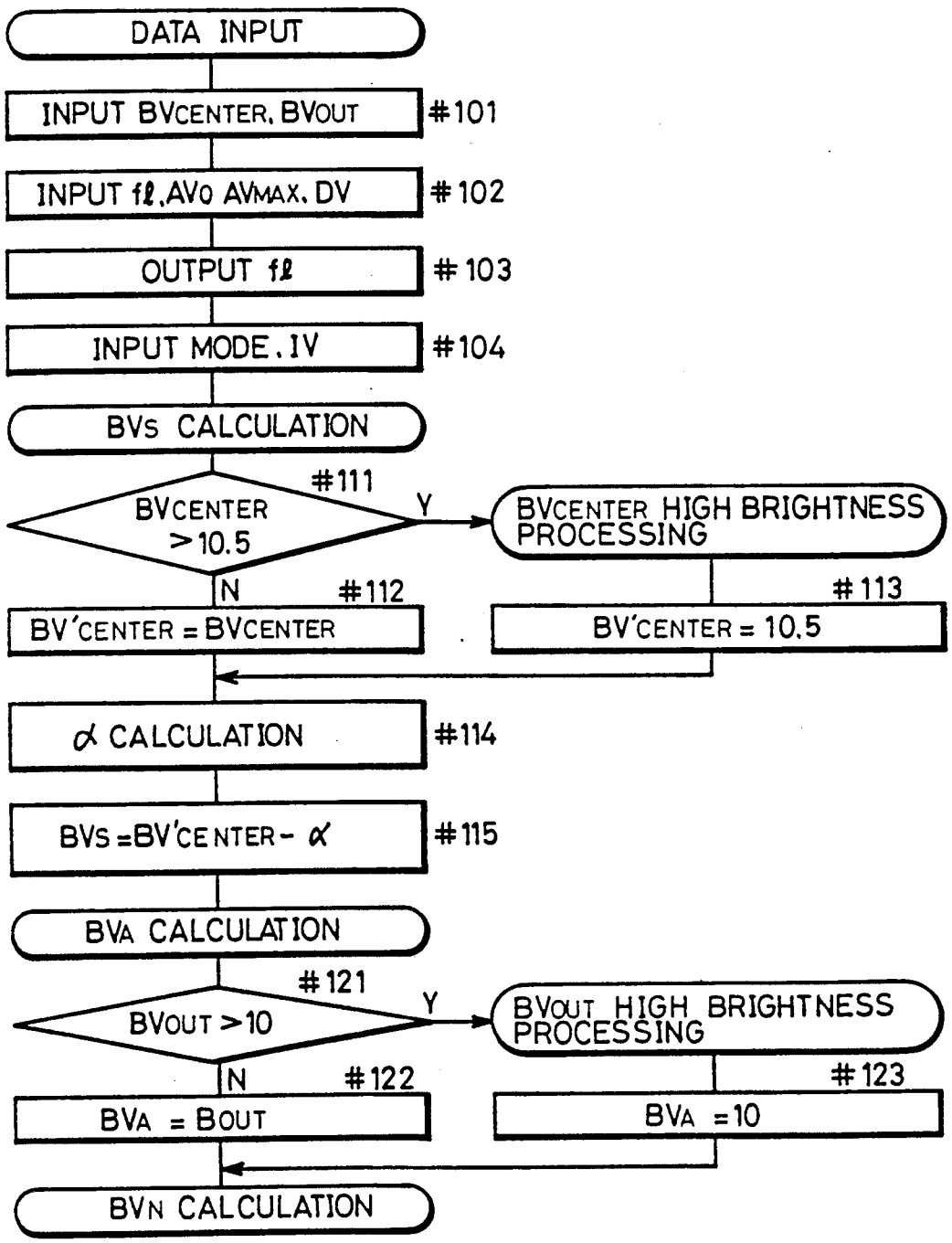
FIG. 3 is a flow chart in association with a data input process out of a flow of calculating the exposure controlling value in the camera system of FIG. 1.

After the determination of the shutter speed TV and the aperture value AV, the control of the microcomputer returns to the step #101 of the flow charts shown in FIG. 3, and the processes are continued.

The exposure controlling value when the above described 3 lenses of 35/F4, 80/F5.6, and 200/F5.6 are applied to the camera system of the present embodiment are shown in the column (c) of Table 3 for the comparison with the above described two examples of the prior art.

Since the brightness value BV at the switching point in the camera system of the present embodiment can be represented as $$BV = min(TVh, TVx) + AVo - SV$$

as described above (FIG. 5, #171), the brightness values of the switching points when respective lenses (35/F4, 80/F5.6, 200/F5.6) are employed will be $$BV = 5.1 + 4 - 5 = 4.1(35/F4)$$

$$BV = 6 + 5 - 5 = 6.0(80/F5.6).$$

The longest object distance D at which the object can be properly exposed with flash light will be D=6.7, 4.9 and 4.9 when the respective lenses (35/F4, 80/F5.6, 200/F5.6) are used. As is apparent from the table, in the camera of the present embodiment, the longest object distance in which the object can be properly exposed with flash light becomes longer when a lens having longer focal length is used in taking photographs with flash light, as compared with the (a) type cameras, so that the range which can be properly photographed with flash light can be widened. Since the brightness value at the switching point becomes large when the lens having longer focal length is employed, so that the possibility of blurring derived from camera shake in taking photographs with ambient light only can be reduced compared with the camera employing the condition (b). In addition, since the brightness value of the switching point becomes smaller when a lens having shorter focal length is used, the defects of the cameras employing the condition (b) can be eliminated. Namely, even if a lens having shorter focal length and larger aperture size is employed, erroneous switching to the photographing operation with flash light can be prevented, when the photograph is to be taken with the ambient light.

As described above, in the aperture value determining apparatus of the present invention, the aperture value AV in taking photographs with flash light is determined in the range of if AVo'≦AVd, then AVo'≦AV, and if AVd<AVo', then AVd≦AV in which the reference character AVd represents the maximum aperture value at which the brightness can be compensated by the flash light and the reference character AVo' represents a prescribed aperture value. Therefore, the photographing characteristic in taking photographs with flash light can be improved and the range in which the brightness can be adjusted by the flash light can be widened As described above, in the camera having low brightness automatic flash emitting function of the present invention, the object distance is not very limited when a lens having longer focal length is employed in taking photographs with flash light, and the blurring derived from a camera shake can be prevented in taking photographs with ambient light. In addition, erroneous switching to the photographing operation with flash light can be prevented even when a lens having large aperture size is used.

Although the present invention has been described and illustrated in detail, it is clearly understood that the same is by way of illustration and example only and is not to be taken by way of limitation, the spirit and scope of the present invention being limited only by the terms of the appended claims.

TABLE 1

| $\Delta BVoc$ | $\beta$ | | | | |
|---|---|---|---|---|---|
| | $\frac{1}{15}$ | $\frac{1}{25}$ | $\frac{1}{55}$ | $\frac{1}{100}$ | |
| | | | $\alpha =$ | | |
| 1 | 0 | 0 | 0 | 0 | 0 |
| 1.25 | 0.125 | 0.25 | 0.375 | 0.5 | 0 |
| 2.75 | 0.25 | 0.5 | 0.75 | 1 | 0 |
| | 0.125 | 0.25 | 0.375 | 0.5 | 0 |

TABLE 2

| | | LOW BRIGHTNESS (C = 0) | REAR LIGHT (C = 1) |
|---|---|---|---|
| AV | $AVd \geqq AVo'$ | $AVo' \leqq AV \leqq AVmax$ | $AVo' \leqq AV \leqq AVd$ |
| | $AVd < AVo$ | $AVd \leqq AV \leqq AVmax$ | $AV = AVd$ |
| TV | | $TVh' \leqq TV \leqq TVx$ | $TVh' \leqq TV \leqq TVx$ |

TABLE 3

| | | (a) | | | (b) | | | (c) | | |
|---|---|---|---|---|---|---|---|---|---|---|
| LENS | | 35/F4 | 80/F5.6 | 200/F5.6 | 35/F4 | 80/F5.6 | 200/F5.6 | 35/F4 | 80/F5.6 | 200/F5.6 |
| fl | | 35 | 80 | 200 | 35 | 80 | 200 | 35 | 80 | 200 |
| AVo | | 4 | 5.0 | 5.0 | 4 | 5.0 | 5.0 | 4 | 5.0 | 5.0 |
| TVh | | 5.1 | 6.3 | 7.6 | 5.1 | 6.3 | 7.6 | 5.1 | 6.3 | 7.6 |
| IV | | 2.6 | 3.6 | 3.6 | 2.6 | 3.6 | 3.6 | 2.6 | 3.6 | 3.6 |
| SWITCHING POINT (BV) | | 4.1 | 6.3 | 7.6 | 5 | 5 | 5 | 4.1 | 6 | 6 |
| PHOTOGRAPH WITH FLASH NEAR SW POINT | AV | 4.1 | 6.3 | 7.6 | 5.0 | 5.0 | 5.0 | 4.1 | 6.0 | 6.0 |
| | TVx | 6.0 | 6.0 | 6.0 | 6.0 | 6.0 | 6.0 | 6.0 | 6.0 | 6.0 |
| | D | 6.7 | 4.4 | 2.8 | 4.9 | 7.0 | 7.0 | 6.7 | 4.9 | 4.9 |
| PHOTOGRAPH WITH AMBIENT LIGHT NEAR SW POINT | AV | 4.0 | 5.0 | 5.0 | 4.0 | 5.0 | 5.0 | 4.0 | 5.0 | 5.0 |
| | TV | 5.1 | 6.3 | 7.6 | 6.0 | 5.0 | 5.0 | 5.1 | 6.0 | 6.0 |

SV = 5, $\Delta$EVfl = −2, TVx = 6
TVh = $\log_2$fl, IV = 2.6 (for fl $\leqq$ 50), 3.6 (for fl > 50)
BV = TVh + AVo − SV ... (a)
BV = 5 ... (b)
BV = min (TVh, TVx) + AVo − SV ... (c)
AV = BV + 1 + SV − TVx
$2\log_2$D = IV + SV − $\Delta$EVfl − AV

What is claimed is:

1. A flash system comprising:
   means for emitting flash light;
   means for measuring brightness of an object;
   a focal plane shutter;
   means for inputting data of focal length of a taking lens;
   means for detecting a limiting shutter speed preventing blurring derived from a camera shake based on the data of focal length;
   means for determining a reference value based on a slower one of a flash synchronized shutter speed of said focal plane shutter and the limiting shutter speed; and
   means, respective to the operation of said focal plane shutter, for making said emitting means emit the flash light when the measured brightness is lower than the reference value.

2. A flash system according to claim 1, wherein said determining means includes:
   means for selecting one of a full open aperture value of the taking lens and a predetermined aperture value, which is not smaller than the other; and
   means for determining the reference value based on the slower shutter speed and the selected aperture value.

* * * * *